(12) United States Patent
Nagatsuka

(10) Patent No.: US 7,106,663 B2
(45) Date of Patent: Sep. 12, 2006

(54) DISK RECORDING/REPRODUCING APPARATUS PROVIDED WITH MAGNET HEAD ASCENDING/DESCENDING MECHANISM

(75) Inventor: Osamu Nagatsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 10/654,045

(22) Filed: Sep. 4, 2003

(65) Prior Publication Data

US 2004/0051990 A1    Mar. 18, 2004

(30) Foreign Application Priority Data

Sep. 13, 2002  (JP)  .............................. 2002-267673

(51) Int. Cl.
*G11B 11/105*  (2006.01)
(52) U.S. Cl. .................................................. 369/13.11
(58) Field of Classification Search ............. 369/13.11, 369/216; 360/250, 254.3, 255.2; 720/659, 720/663, 672, 690
See application file for complete search history.

(56) References Cited

U.S. PATENT DOCUMENTS 6,088,203 A  *  7/2000  Nakamura et al. ....... 360/255.2
6,411,596 B1       6/2002  Nagatsuka ................... 369/291
6,631,112 B1 * 10/2003  Kurita et al. ............... 720/638
2003/0133397 A1   7/2003  Nagatsuka ................... 369/223
2004/0233582 A1 * 11/2004  Murakami et al. ....... 360/255.2

* cited by examiner

*Primary Examiner*—Julie Anne Watko
(74) *Attorney, Agent, or Firm*—Fitzpatrick, Cella, Harper & Scinto

(57) ABSTRACT

The disk recording/reproducing apparatus of the present invention has a magnetic head which ascends or descends between a descent position proximate to a disk recording medium housed in a cartridge and an ascent position which is separate from the medium, an ascending/descending control lever which controls ascent/descent of the magnetic head, a driving section which drives the ascending/descending control lever, and an ejecting operation section which couples with the ascending/descending control lever and can move between a position where the cartridge is allowed to be ejected out of the apparatus and a position where the cartridge is disabled from being ejected in accordance with the movement of the ascending/descending control lever, wherein the length of movement of the ascending/descending control lever is greater than the length of movement of the ejection operation section.

4 Claims, 10 Drawing Sheets

DISK RECORDING/REPRODUCING APPARATUS PROVIDED WITH MAGNET HEAD ASCENDING/DESCENDING MECHANISM

BACKGROUND OF THE INVENTION

1. Field of the Invention

The present invention relates to a disk recording/reproducing apparatus having an ascending/descending mechanism for moving a magnetic head used to record and/or reproduce an information signal on a disk recording medium such as a magneto-optical disk, closer to or away from the disk recording medium.

2. Related Background Art

A disk recording/reproducing apparatus which uses a magneto-optical disk as a recording medium enabling an information signal to be recorded using a light beam emitted from an optical pickup apparatus and action of an external magnetic field applied from a magnetic head is conventionally available.

When recording an information signal on a magneto-optical disk, this type of disk recording/reproducing apparatus slides and moves the magnetic head closer to the principal surface of the magneto-optical disk provided with a signal recording area. On the other hand, when reproducing an information signal recorded on the magneto-optical disk, no external magnetic field needs to be applied from the magnetic head, and therefore the magnetic head is moved to a position away from the principal surface of the magneto-optical disk.

Thus, moving the magnetic head away from the magneto-optical disk when the magnetic head need not be used prevents the magnetic head and the magneto-optical disk from mutually sliding over each other and thereby causing the magnetic head and magneto-optical disk to wear out, which improves durability of the magnetic head and magneto-optical disk.

The disk recording/reproducing apparatus which uses as a recording medium a magneto-optical disk for enabling an information signal to be recorded consists of a main body of the apparatus including a disk rotation driving mechanism and an optical pickup apparatus which constitutes recording/reproducing means and a holder supported in a rotatable manner by the main body of the apparatus for loading a disk cartridge in the recording/reproducing position on the main body side. This disk recording/reproducing apparatus is constructed such that a magnetic head is attached to one end of a head support arm which extends over the holder and the head support arm is rotated and operated in accordance with the rotation and operation of the holder.

When recording an information signal, the disk recording/reproducing apparatus including the head support arm for supporting the magnetic head extended on the holder which is supported in a rotatable manner by the main body of the apparatus allows the magnetic head to go into the holder through an opening for insertion of the magnetic head provided in the holder and be loaded (slid over the magneto-optical disk) in the recording/reproducing position. In the case of this disk recording/reproducing apparatus, inserting or removing the disk cartridge while the magnetic head remains in the holder may cause the disk cartridge to collide with the magnetic head, thereby resulting in damage to the magnetic head.

Thus, when inserting or removing the disk cartridge into or from the holder, this type of disk recording/reproducing apparatus moves the magnetic head from the position at which the information signal recorded on the magneto-optical disk is reproduced to an ascent position outside the holder in order to ensure that the disk cartridge is prevented from colliding with the magnetic head.

The disk recording/reproducing apparatus which uses as a recording medium a magneto-optical disk for enabling an information signal to be recorded is structured to control the ascending and descending of the position of the magnetic head according to a recording mode in which an information signal is recorded on the magneto-optical disk and a reproducing mode in which it is possible to eject the magneto-optical disk loaded in the recording/reproducing position and the information signal recorded in the magneto-optical disk is reproduced. This ascending/descending control of the magnetic head is carried out by moving and operating an ascending/descending control lever, which operates the ascending and descending of an ascending/descending operation member to operate the ascending/descending of the magnetic head, using a driving motor. The ascending/descending operation member and the ascending/descending control lever are coupled by a coupling member.

In order to control the ascending and descent positions of the magnetic head according to various operation modes, the disk recording/reproducing apparatus detects the position of the ascending/descending operation lever or coupling member, detects the position of the magnetic head and drives and controls the driving motor according to the detected position of the magnetic head.

A conventional disk recording/reproducing apparatus has three positions of the magnetic head, i.e., recording mode position, reproducing mode position and eject position, and ascends or descends the magnetic head by driving the magnetic head ascending/descending operation member using a cam which is often provided on the coupling member. However, in order to ascend the magnetic head, which is biased by a biasing member or the like at the descent position, against the biasing force, the ascending/descending operation is performed with a limited amount of movement of the ascending/descending operation lever to avoid upsizing of the disk recording/reproducing apparatus, which makes the angle of the cam shaper, requires a driving source (motor) with a large driving force or a deceleration mechanism to obtain the driving force, making it further difficult to reduce the size of the apparatus.

SUMMARY OF THE INVENTION

Thus, the present invention provides a disk recording/reproducing apparatus intended to further reduce the size of the apparatus.

The present invention also provides a disk recording/reproducing apparatus capable of setting a plurality of positions of the magnetic head without increasing the size of the disk recording/reproducing apparatus and realizing high performance such as increasing the number of operation modes according to the position of the ascending/descending operation lever.

The disk recording/reproducing apparatus of the present invention comprises: a magnetic head which ascends or descends between a descent position proximate to a disk recording medium housed in a cartridge and an ascent position away from the medium, an ascending/descending control lever which controls the ascending and descending of the magnetic head, a driving section for driving the ascending/descending control lever, and an ejecting operation section which is coupled with the ascending/descending control lever and which is movable between a position at which the cartridge is allowed to be ejected outside the apparatus and a position at which the cartridge is disabled from being ejected according to the movement of the ascending/descending control lever, wherein the length of movement of the ascending/descending control lever is greater than the length of movement of the ejecting operation section.

DESCRIPTION OF THE PREFERRED EMBODIMENTS

<Embodiment 1>

With reference now to the attached drawings, the disk recording/reproducing apparatus and the magnetic head ascending/descending control apparatus according to the present invention will be explained below.

Figure 1:
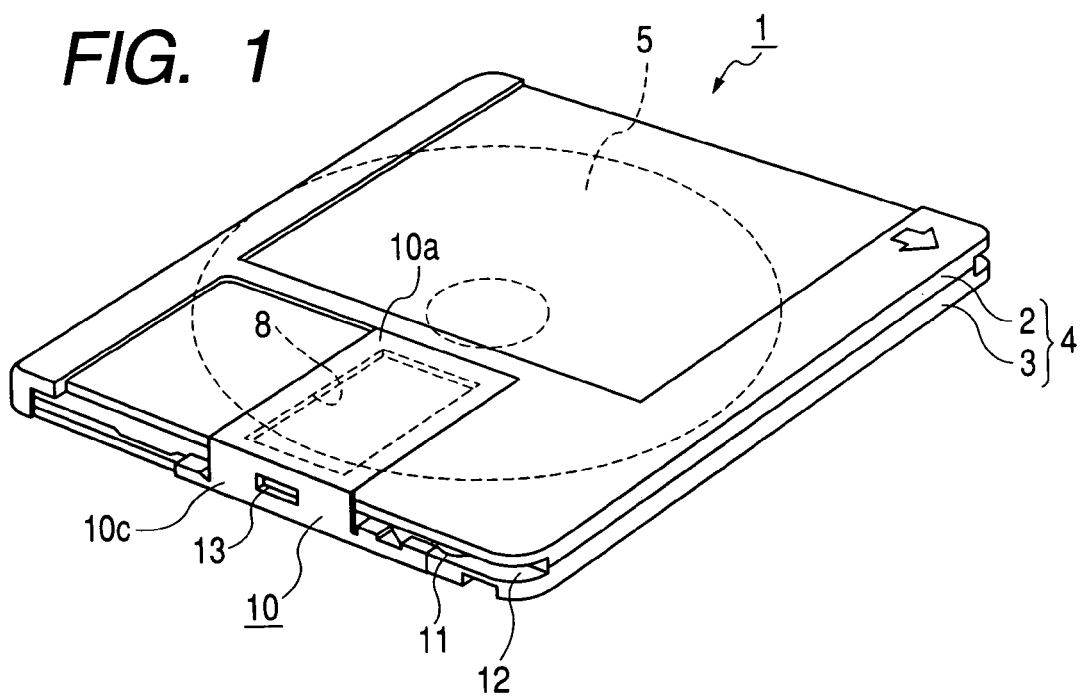
FIG. 1 is a perspective view of a disk cartridge used for a disk recording/reproducing apparatus of the present invention.
Figure 2:
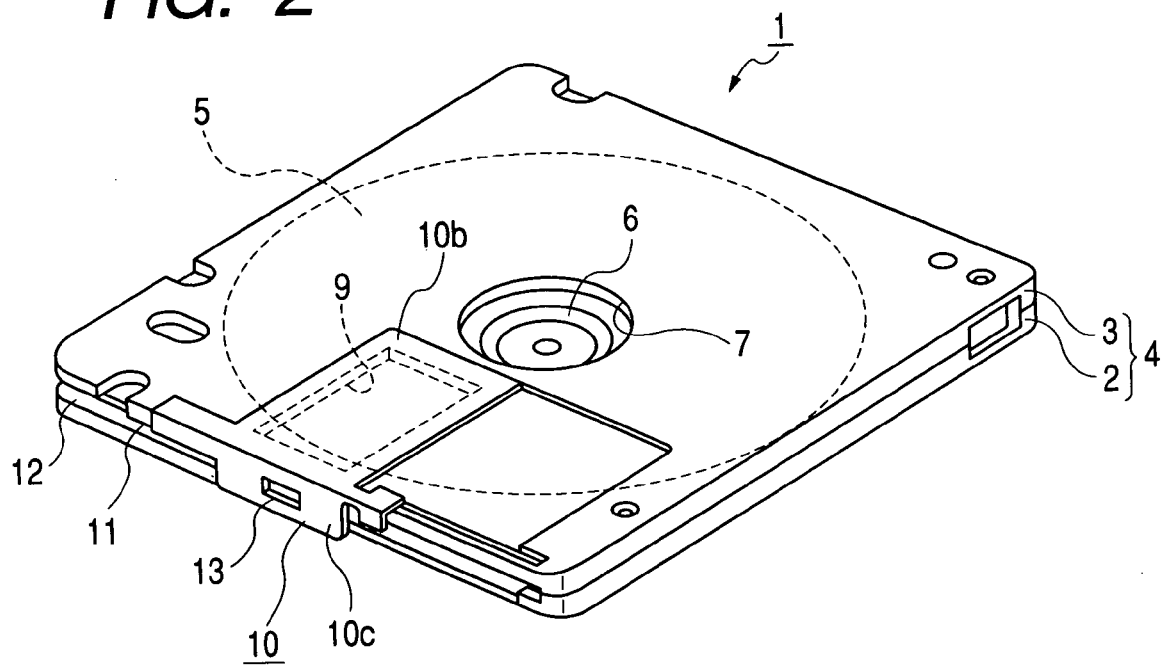
FIG. 2 is a perspective view of the undersurface of the disk cartridge.

First, the disk cartridge used for the disk recording/reproducing apparatus according to this embodiment will be explained. As shown in FIG. 1 and FIG. 2, this cartridge 1 is constructed of a cartridge main body 4 made up of a pair of upper and lower halves 2 and 3 coupled face to face in which a magneto-optical disk 5 allowing an information signal to be recorded is housed in a rotatable manner. In the center of the undersurface of the cartridge main body 4, a central opening 7 is provided which gives a disk hub 6 attached to the center of the magneto-optical disk 5 housed in this cartridge main body 4 access to the outside as shown in FIG. 2.

Also provided are an opening 8 for recording and an opening 9 for recording/reproducing which gives a part of the signal recording area formed on the principal surface of the magneto-optical disk 5 housed in a cartridge main body 4 access to the outside at the inner and outer radii. These openings 8 and 9 are located at the center in the horizontal direction of the cartridge main body 4 and formed from the immediate neighborhood of the center of the cartridge main body 4 toward one side thereof.

Furthermore, the cartridge main body 4 is provided with a shutter member 10 which opens or closes the recording opening 8 and the recording/reproducing opening 9 in a movable form. The shutter member 10 is a thin metal plate folded in a horseshoe shape, set to the cartridge main body 4 so as to engage with the cartridge main body 4 from one side thereof, and moved and operated along the one side of the cartridge main body 4. When the shutter member 11 is placed in the position closing the openings 8 and 9, the shutter member 10 is locked by a shutter lock member 11 provided inside the cartridge main body 4, which regulates the movement of the shutter member 10. When the disk cartridge 1 is inserted into the holder apparatus, a shutter opening member on the holder apparatus side which approaches a shutter opening member approach groove 12 formed on one side of the cartridge main body 4 unlocks the shutter lock member 11, which causes the shutter member 10 to move in the direction in which the openings 8 and 9 are opened.

An engagement hole 13 for engaging with a movement regulating member provided on the holder apparatus side is made in the center of a coupling piece 10c which couples shutter members 10a and 10b for closing the recording opening 8 and recording/reproducing opening 9 of the shutter member 10. The shutter opening member approach groove 12 is formed with, as an open end, the side orthogonal to one side of the cartridge main body 4 on which the shutter member 10 moves.

The disk cartridge 1 formed in this way is inserted into the holder apparatus such that the side which the open end of the shutter opening member approach groove 12 faces is parallel to the insertion direction.

Figure 3:
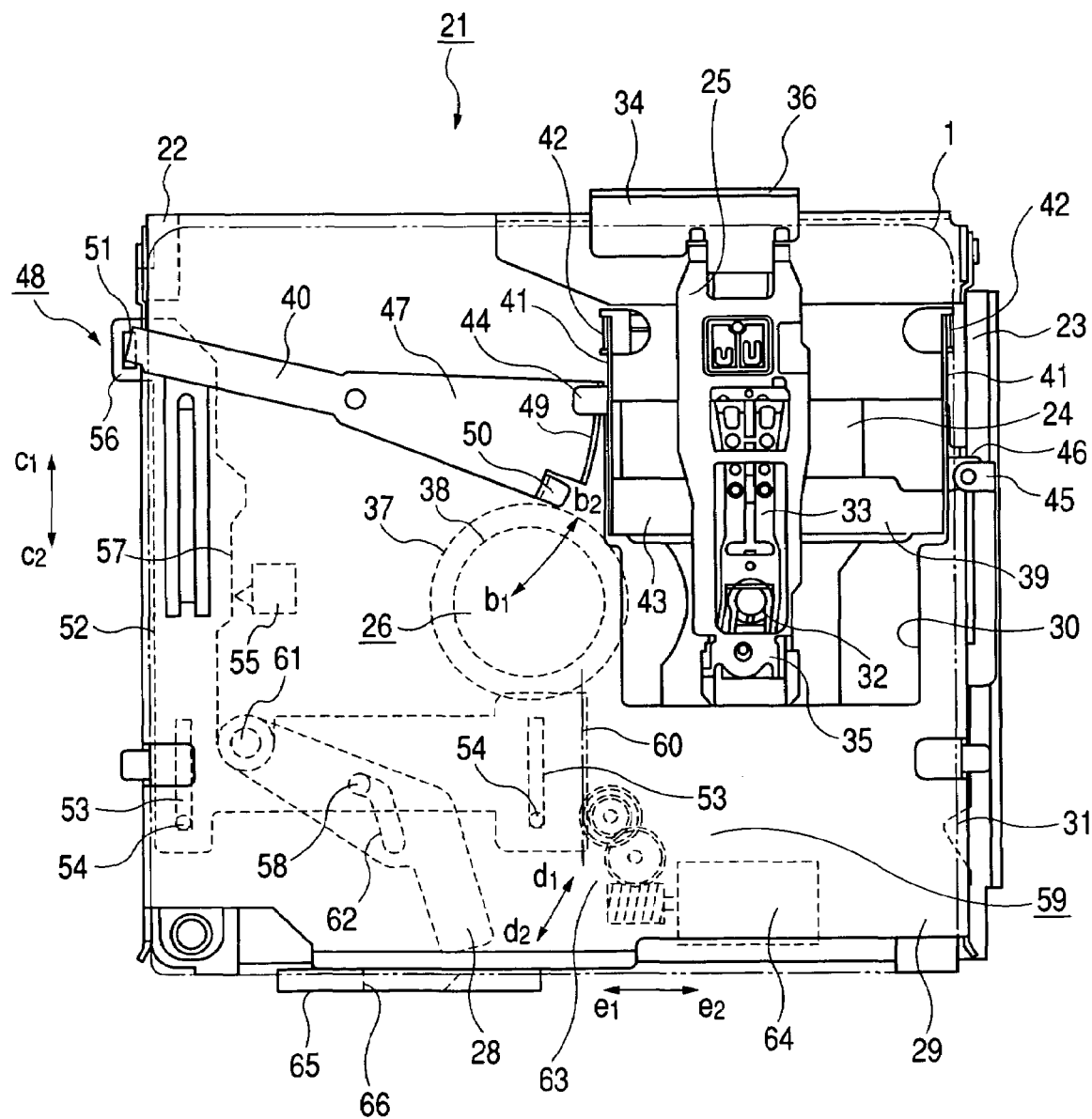
FIG. 3 is a plan view of the disk recording/reproducing apparatus of the present invention.

As shown in FIG. 3, a disk recording/reproducing apparatus 21 is provided with a cartridge holder 22 which holds the disk cartridge 1 and moves the disk cartridge 1 between an inserting/removing position for inserting or removing the disk cartridge 1 to or from the inside of the apparatus and a cartridge mounting position for performing recording/reproducing on the disk cartridge 1, a base chassis 23 which supports this cartridge holder 22 in a movable manner, an optical pickup section 24 which records/reproduces information on the magneto-optical disk 5, a magnetic head section 25 which records information on the magneto-optical disk 5 and a disk rotation driving mechanism 26 which rotates/drives the magneto-optical disk 5.

Furthermore, as shown in FIGS. 3 to 9, the disk recording/reproducing apparatus 21 is also provided with a head ascending/descending mechanism which ascends or descends the magnetic head section 25 with respect to the magneto-optical disk 5 and an ejection operation switching member 28 which switches whether the disk cartridge 1 is ejectable to the outside of the disk recording/reproducing apparatus 21 or not.

As shown in FIG. 3, the cartridge holder 22 is provided with a top plate 29 formed in a position facing the principal surface of the inserted disk cartridge 1 and a magnetic head insertion opening 30 provided on this top plate 29. Furthermore, the cartridge holder 22 is provided with a movement regulating member 31 which opens or closes the shutter member 10 and engages with the engagement hole 13. This cartridge holder 22 is supported through a rotation spindle in a rotatable manner by the base chassis 23.

The base chassis 23 is rectangular-shaped which is a little greater than the outline of the principal surface of the disk cartridge 1, and a disk rotation driving mechanism 26 which rotates and drives the magneto-optical disk 5 is provided substantially in the center of the principal surface.

Though the optical pickup section 24 is provided with a light source for emitting a laser beam, an objective lens for focusing the laser beam on the recording area of the magneto-optical disk 5, a two-axis actuator for driving and displacing this objective lens in two axial directions and a photoreception section for receiving retuned light from the recording area, which are not shown. This optical pickup section 24 is placed on the base chassis 23 in a manner movable in the diameter direction of the magneto-optical disk 5 through a feeding mechanism not shown.

As shown in FIG. 3, the magnetic head section 25 is placed in a position facing the optical pickup section 24. As shown in FIGS. 3 to 9, the magnetic head section 25 is provided with a magnetic head 32 which records information on the magneto-optical disk 5, a support arm 33 which supports this magnetic head 32 at its end, a support plate 34 which supports the support arm 33 in a displaceable manner and a magnetic head holding plate 35 which holds the magnetic head 32 during an ascent. The magnetic head holding plate 35 is coupled with the support arm 33 and movable with respect to the support plate 34 as in the case of the support arm 33. The base end of the support plate 34 is coupled with a coupling member 36 that couples the magnetic head section 25 and the optical pickup section 24 and slidable in the directions indicated by arrows a1 and a2 in FIG. 5.

Then, these optical pickup section 24 and magnetic head section 25 move together in the diameter direction of the magneto-optical disk 5 on the base chassis 23 through the coupling member 36.

As shown in FIG. 3, the disk rotation driving mechanism 26 is provided with a disk table 37 on which the magneto-optical disk 5 of the disk cartridge 1 is placed and a spindle motor 38 which rotates and drives this disk table. The spindle motor 38 is provided so as to stick out of the principal surface of the base chassis 23.

Figure 4:
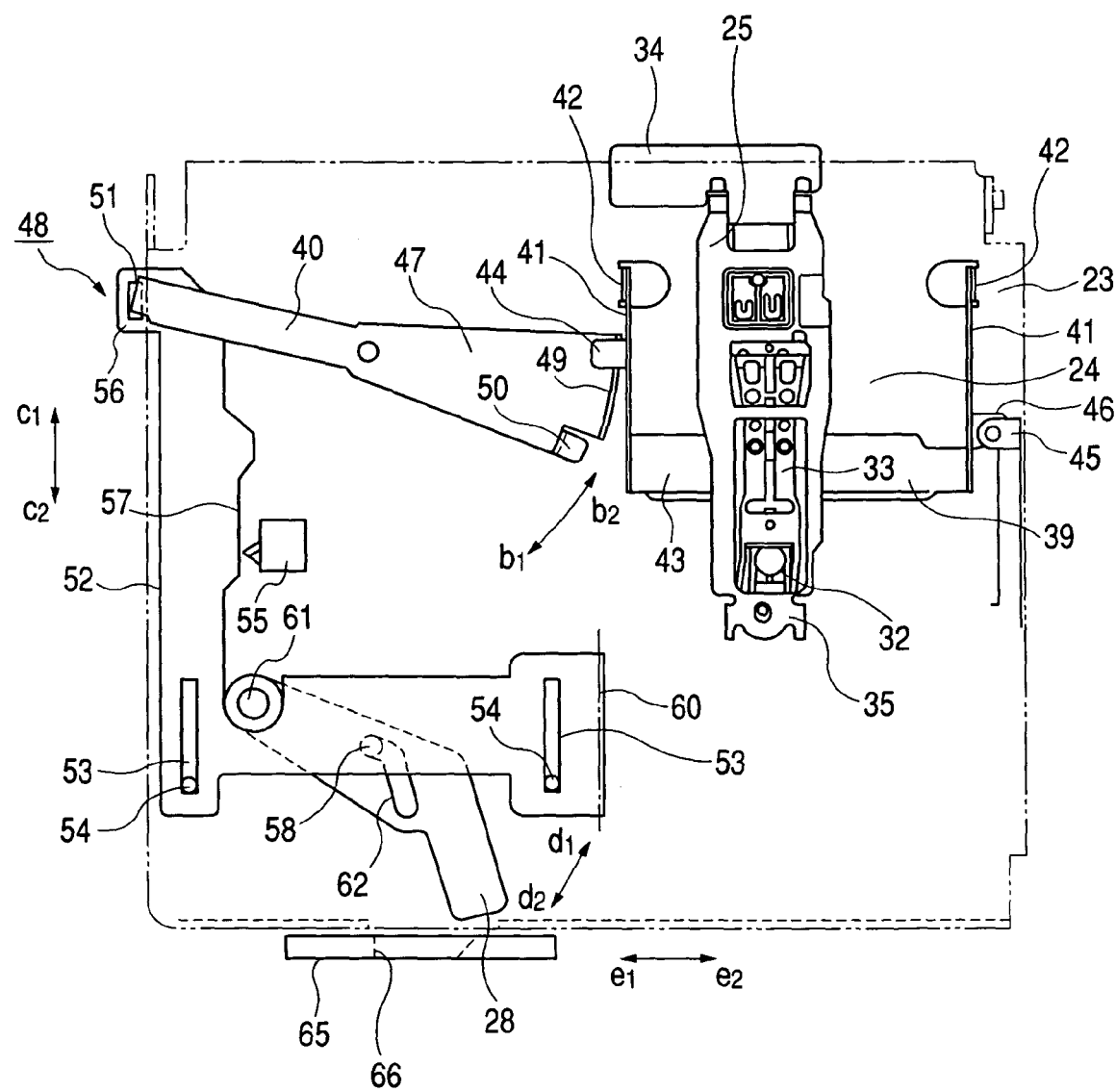
FIG. 4 is a plan view of the apparatus of FIG. 3 showing a state that a magnetic head ascending/descending mechanism has moved a magnetic head away from a magneto-optical disk.
Figure 5:
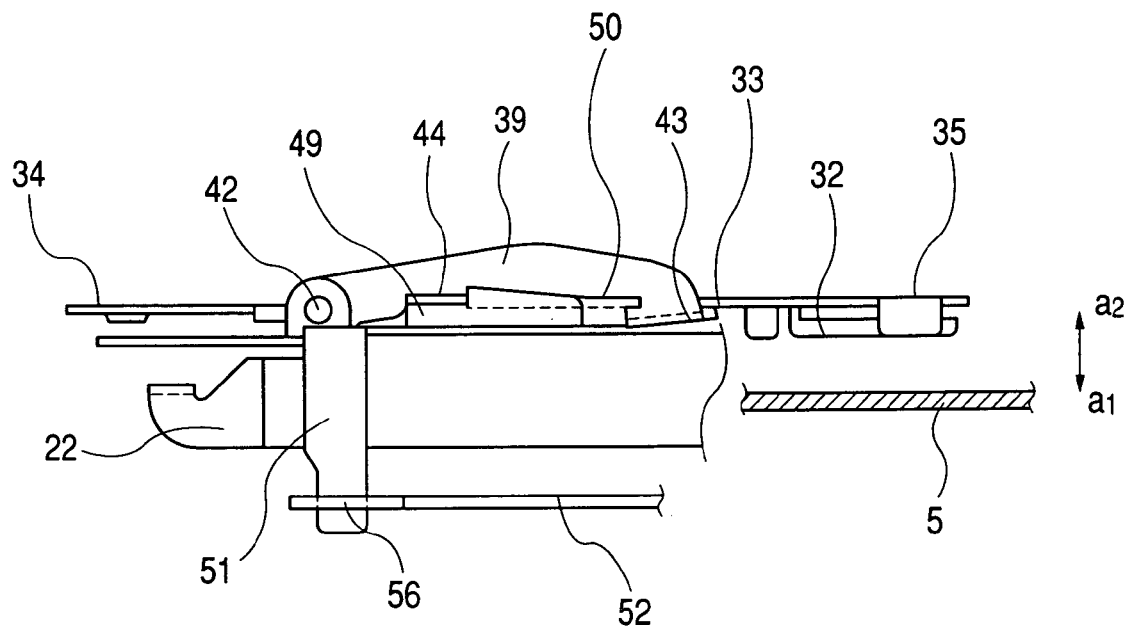
FIG. 5 is a side view of one side of the state shown in FIG. 4.
Figure 6:
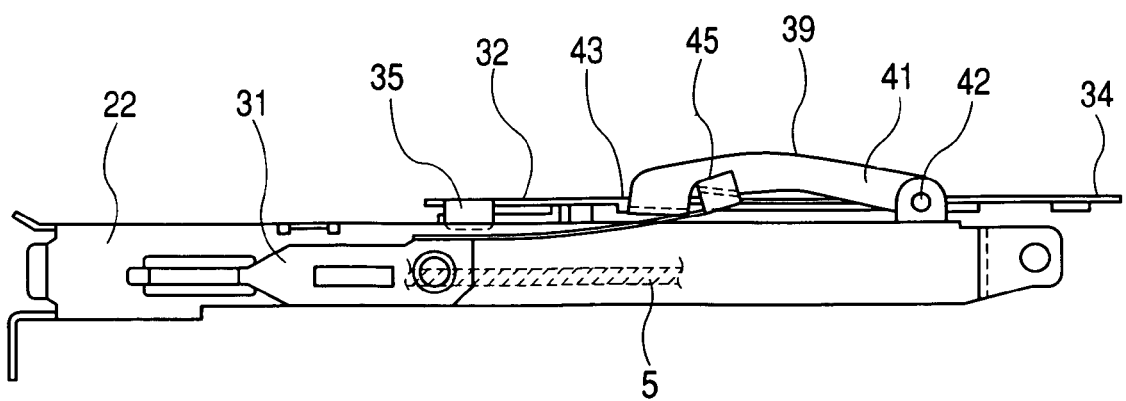
FIG. 6 is a side view of the other side of the state shown in FIG. 4.

As shown in FIG. 3 and FIG. 4, the head ascending/descending mechanism is provided with an ascending/descending operation plate 39 rotated in the directions indicated by the arrows a1 and a2 in FIG. 5 in order to ascend or descend the magnetic head 32 of the magnetic head section 25 in the direction of moving it closer to or away from the magneto-optical disk 5 in the disk cartridge 1 on the top plate 29 of the cartridge holder 22 and a rotation operation lever 40 rotated in the directions indicated by arrows b1 and b2 in FIG. 3 and FIG. 4 in order to rotate the ascending/descending operation plate 39.

The ascending/descending operation plate 39 is formed as a substantially flat plate and has support pieces 41 integrally formed therewith on both sides, and rotation spindles 42 are formed as protruding portions as a single body supported in a manner rotatable in the directions indicated by the arrows a1 and a2 in FIG. 4 by the cartridge holder 22 at the ends of these support pieces 41.

As shown in FIG. 3, on the ascending/descending operation plate 39, a contact section 43 which contacts the support arm 33 of the magnetic head section 25 is integrally formed at a position facing the support arm 33 on one side. On the ascending/descending operation plate 39, an actuating section 44 rotated by the rotation operation lever 40 and a contact section 46 which contacts an ascending/descending operation plate biasing section 45 extended from the movement regulating member 31 are integrally formed.

The rotation operation lever 40 is supported on and by the cartridge holder 22 in a manner rotatable around an axis in the directions indicated by arrows b1 and b2 in FIG. 3 and has an operation section 47 which rotates and operates the ascending/descending operation plate 39 and a coupling section coupled with an ascending/descending control mechanism 48. As shown in FIG. 3, the operation section 47 extends from the center of rotation to the vicinity position of the ascending/descending operation plate 39, and an operation piece 49 protruding in the direction substantially perpendicular to the rotation direction and an engagement section 50 with the ascending/descending operation plate 39 are integrally formed at its end. This operation piece 49 contacts the actuating section 44 of the ascending/descending operation plate 39. As shown in FIG. 5, the coupling section 51 is formed orthogonal to the principal surface of the top plate 29 of the cartridge holder 22 and its end is coupled with the ascending/descending control mechanism 48.

As shown in FIG. 3, the ascending/descending control mechanism 48 is placed on the undersurface of the base chassis 23 and has an ascending/descending control lever 52 which controls ascending and descending of the magnetic head 32, an ejection operation switching member 28 which switches whether the disk cartridge 1 is ejectable or not, a detecting means 53 which detects the position of the ascending/descending control lever 52 and a driving means 59 which moves and operates the ascending/descending control lever 52.

On the principal surfaces of the ascending/descending control lever 52, guide slits 53, 53 are formed, and guide shafts 54, 54 standing erect on the base chassis 23 are inserted in these guide slits 53, 53 in a movable manner. The base chassis 23 has a detection section 55 which detects the movement of the ascending/descending control lever 52. Furthermore, the ascending/descending control lever 52 is provided with a driving section 56 which drives the rotation operation lever 40, a stepped cam section 57 which contacts the detection section 55, a driving shaft 58 which drives the ejection operation switching member 28 and rack section 60 that engages with the driving means 59.

The ejection operation switching member 28 is rotatable around a rotation shaft 61 standing erect on the base chassis 23 in the directions indicated by arrows d1 and d2 in FIG. 3 and FIG. 4, and is operated by engaging a guide cam 62 provided near its center with the driving shaft 58 of the ascending/descending control lever 52.

The rotation operation lever driving section 56 has a rectangular-shaped hole and faces the outside of the base chassis 23, and the end of the coupling section 51 of the rotation operation lever 40 is inserted the hole. The rack section 60 engages with a gear 63 provided for the driving means 59 and the ascending/descending control lever 52 is driven in the directions indicated by arrows c1 and c2.

The ascending/descending control lever driving means 59 has a motor 64 which is a driving source and the gear 63 which is a deceleration mechanism, and the gear engages with the rack section 60 of the ascending/descending control lever 52.

A cartridge ejecting operation section 65 is provided outside the cartridge insertion/removal side of the base chassis 23 and movable in the directions indicated by arrows e1 and e2 in FIG. 3 and FIG. 4. The ejecting operation section 65 is provided with an opening 66 which the ejection operation switching lever 28 goes in.

The ascending and descending operations of the magnetic head 32 of the magnetic head section 25 with respect to the magneto-optical disk 5 in the magnetic head ascending/descending control apparatus with the above-described configuration will be explained with reference to the attached drawings.

First, with regard to the ascending/descending control mechanism, as shown in FIG. 5, the operation piece 49 of the rotation operation lever 40 contacts the actuating section 44 of the ascending/descending operation plate 39 in an initial state and the ascending/descending operation plate 39 is rotated in the direction indicated by the arrow a2 in FIG. 5. By doing so, the contact section 43 of the ascending/descending operation plate 39 is moved to a position where the magnetic head 32 is distant from the magneto-optical disk 5 through the support arm 33 of the magnetic head section 25. At this time, the ascending/descending operation plate biasing section 45 of the movement regulating member 31 contacts the contact section 46 of the ascending/descending operation plate 39 and the rotation of the ascending/descending operation plate 39 in the direction a1 is biased.

The ascending/descending control lever 52 is one-sided in the direction c1 in FIG. 4, the ejection operation switching member 28 is one-sided in the direction d1 in connection with the driving shaft 58 on the ascending/descending control lever 52, the ejection operation switching member 28 is not inserted into the opening 66 of the ejecting operation section 65, and therefore the cartridge can be ejected in this condition. If the cartridge holder 22 is rotated in the direction a2, the cartridge can be ejected in the state that the magnetic head 32 is away from the magneto-optical disk 5.

Then, the operation will be explained with reference to FIGS. 7 to 9.

In the magnetic head ascending/descending control mechanism, the motor 64 is driven through the operation of the disk recording/reproducing apparatus 21, its driving force is transmitted through the gear 63 and the ascending/descending control lever 52 is driven in the direction indicated by the arrow c2 in FIG. 5. The detection section 55 on the base chassis 23 contacts the cam section 57 of the ascending/descending control lever 52, the rotation of the motor 64 is stopped by its detection signal and the ascending/descending control lever 52 also stops. While the ascending/descending control lever 52 is moving, the rotation operation lever coupling section 51 coupled with the rotation operation lever driving section 56 is driven and the rotation operation lever 40 is rotated in the direction indicated by the arrow b2 in FIG. 7.

Figure 8:
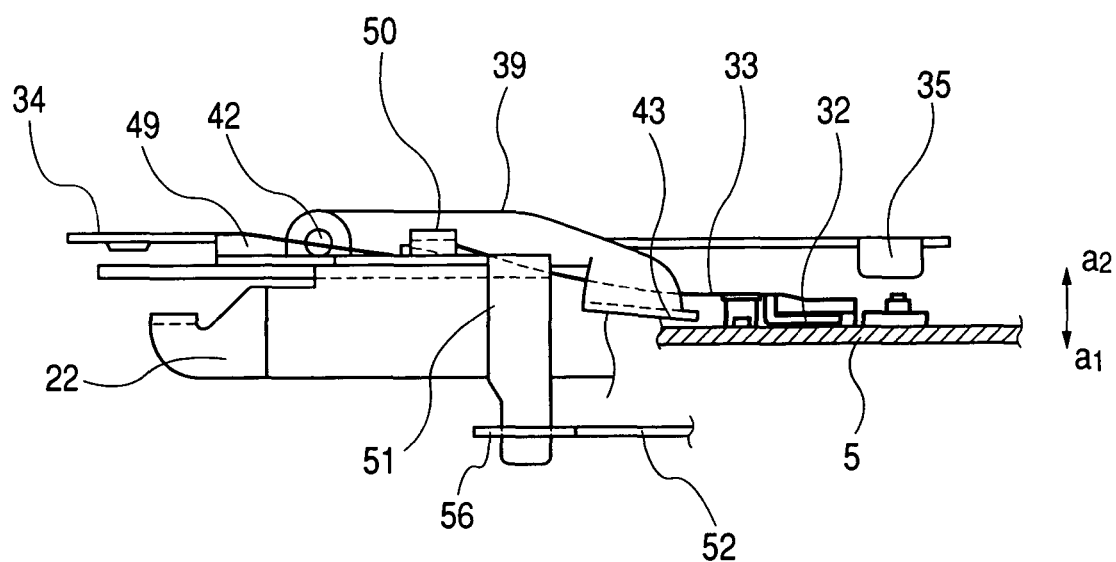
FIG. 8 is a side view of one side of the state shown in FIG. 7.
Figure 9:
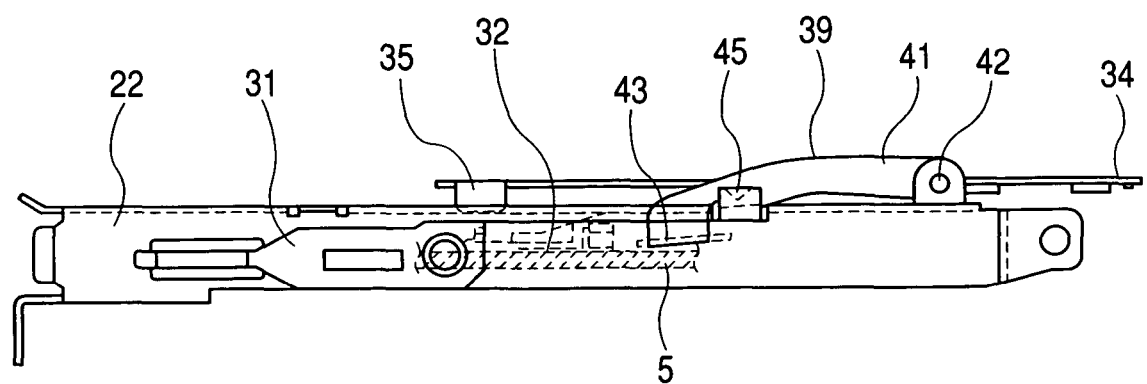
FIG. 9 is a side view of the other side of the state shown in FIG. 7.

The actuating section 44 of the ascending/descending operation plate 39 is driven according to the inclination of the operation piece 49 provided at the end of the operation section 47 of the rotation operation lever 40, and the ascending/descending operation plate 39 is rotated in the direction indicated by the arrow a1 in FIG. 8. The contact section 43 of the ascending/descending operation plate 39 moves to a recording position where the magnetic head 32 is close to the magneto-optical disk 5 through the support arm 33 of the magnetic head section 25. In this way, the magnetic head 32 faces the recording area of the magneto-optical disk 5, whereby the magnetic head 25 is allowed to record information. The actuating section 44 of the ascending/descending operation plate 39 goes into the undersurface of the engagement section 50 of the rotation operation lever 40 and regulates the rotation in the a2 direction of the ascending/descending operation plate 39.

The ejection operation switching member 28 is rotated in the direction indicated by the arrow d2 in FIG. 5 through the engagement between the driving shaft 58 of the ascending/descending control lever 52 and the guide cam 62, the ejection operation switching member 28 goes into the opening 66 of the ejecting operation section 65, which disables the ejection operation. That is, in a recording state with the magnetic head 32 located close to the magneto-optical disk 5, the operation of ejecting the cartridge is disabled.

Figure 7:
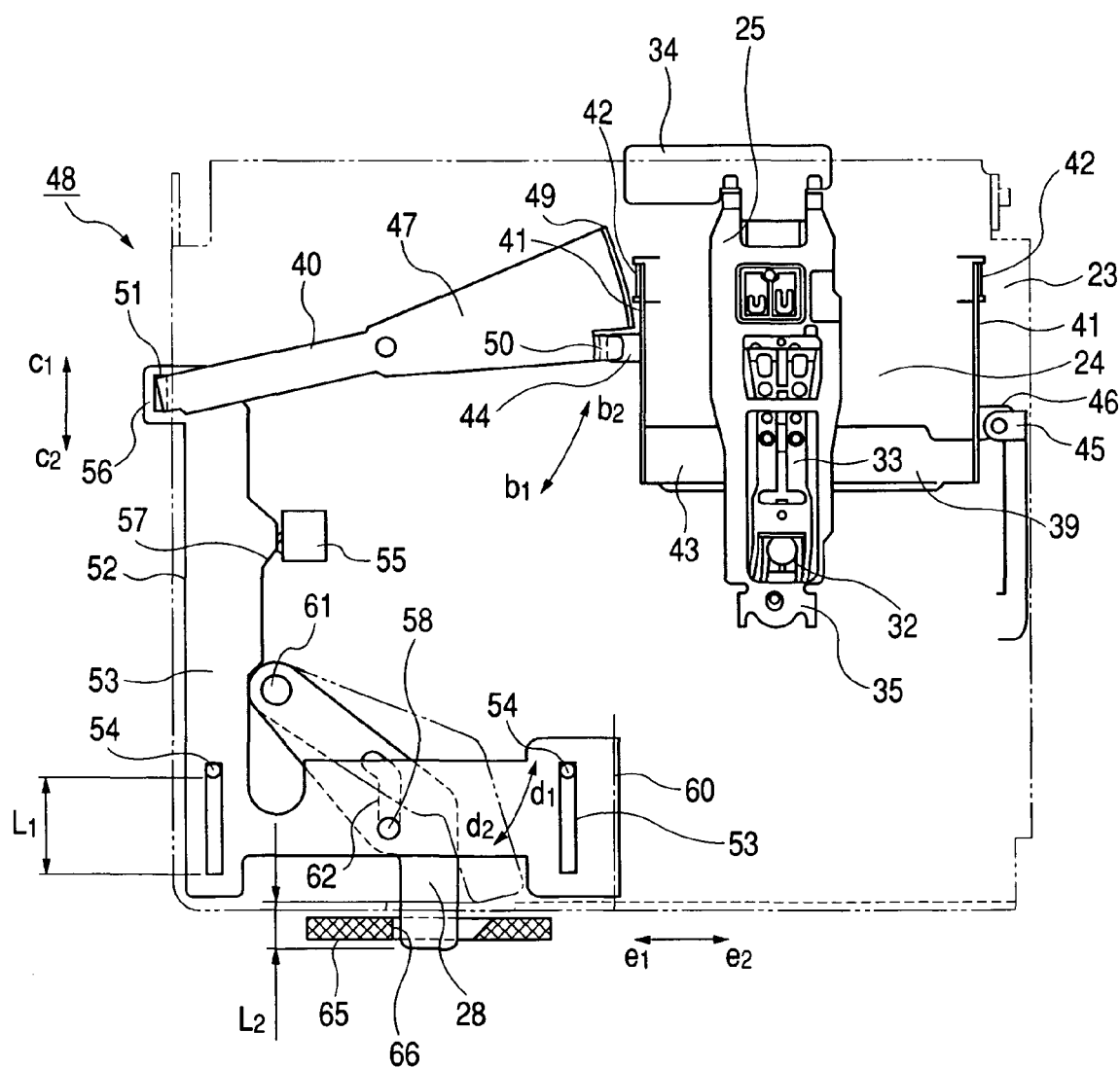
FIG. 7 is a plan view of the apparatus of FIG. 3 showing a state that the magnetic head ascending/descending mechanism has moved the magnetic head closer to the magneto-optical disk.

While the ascending/descending control lever 52 moves in the direction c2 in FIG. 7 by a length L1, the ejection operation switching member 28 rotates in the direction d2 in FIG. 7. The guide cam 62 is designed such that compared with the length L1 in the operation direction of the ascending/descending control lever 52, the length L2 of movement of the ejection operation switching member 28 in the same direction becomes shorter, whereby preventing the ejection operation switching member 28 and disabling the operation of the ejecting operation section 65 from largely sticking out of the disk recording/reproducing apparatus 21.

Furthermore, since the ejection operation switching member 28 is independently provided with the ascending/descending control lever 52, it is possible to provide a large rotation angle of the rotation operation lever 40 and reduce the angle of inclination of the cam which ascends the magnetic head section 25 of the operation piece 49 from a proximate position to a separate position.

As described above, according to this magnetic head ascending/descending control apparatus, it is possible to provide a greater length of movement for the ascending/descending control lever 52 unlike the length of movement of the ejection operation switching member 28, thereby reducing the inclination of the head ascending/descending cam to reduce the driving load, and reducing the size of the driving motor or eliminating the deceleration mechanism to reduce the size of the disk recording/reproducing apparatus.

<Embodiment 2>

Then Embodiment 2 of the present invention will be explained with reference to FIGS. 10 to 13.

According to this embodiment, the ejection operation switching member provided on the base chassis 23 in a rotatable manner as shown in Embodiment 1 is mounted on the ascending/descending control lever. Here, a member in Embodiment 2 having the same function as that in Embodiment 1 is assigned the same reference numeral and duplicate explanation will be omitted.

Figure 10:
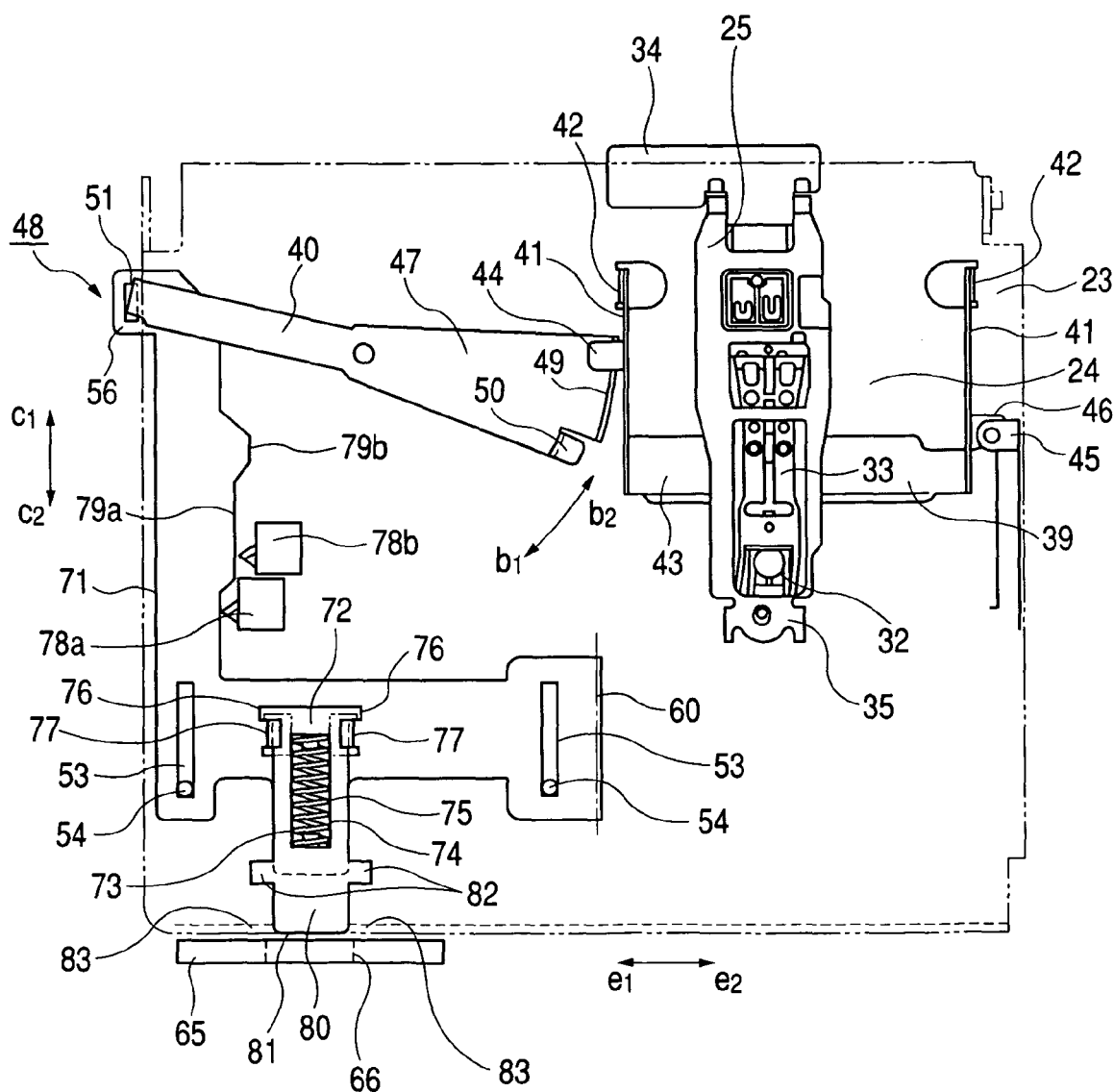
FIG. 10 is a plan view of a second embodiment of a disk recording/reproducing apparatus of the present invention.

As shown in FIG. 10, in this embodiment, an ejection operation switching member 72 is provided on an ascending/descending control lever 71 in a manner movable in the directions indicated by arrows c1 and c2 in FIG. 10 with respect to the ascending/descending control lever 71, and a compression spring 75 provided in an opening 73 of the ascending/descending control lever 71 and in an opening 74 of the ejection operation switching member 72 causes a first stopper section 76 of the ejection operation switching member to contact a contact section 77 of the ascending/descending control lever 71 and always biases them in the direction indicated by the arrow c2 in FIG. 10.

Furthermore, a base chassis 23 is provided with detection sections 78a and 78b which detect the position of the ascending/descending control lever.

FIG. 10 shows a situation in which a magnetic head section 25 according to this embodiment has been moved away from a magneto-optical disk 5 and neither of the detection sections 78a and 78b contacts a cam section 79 of the ascending/descending control lever 71.

Figure 11:
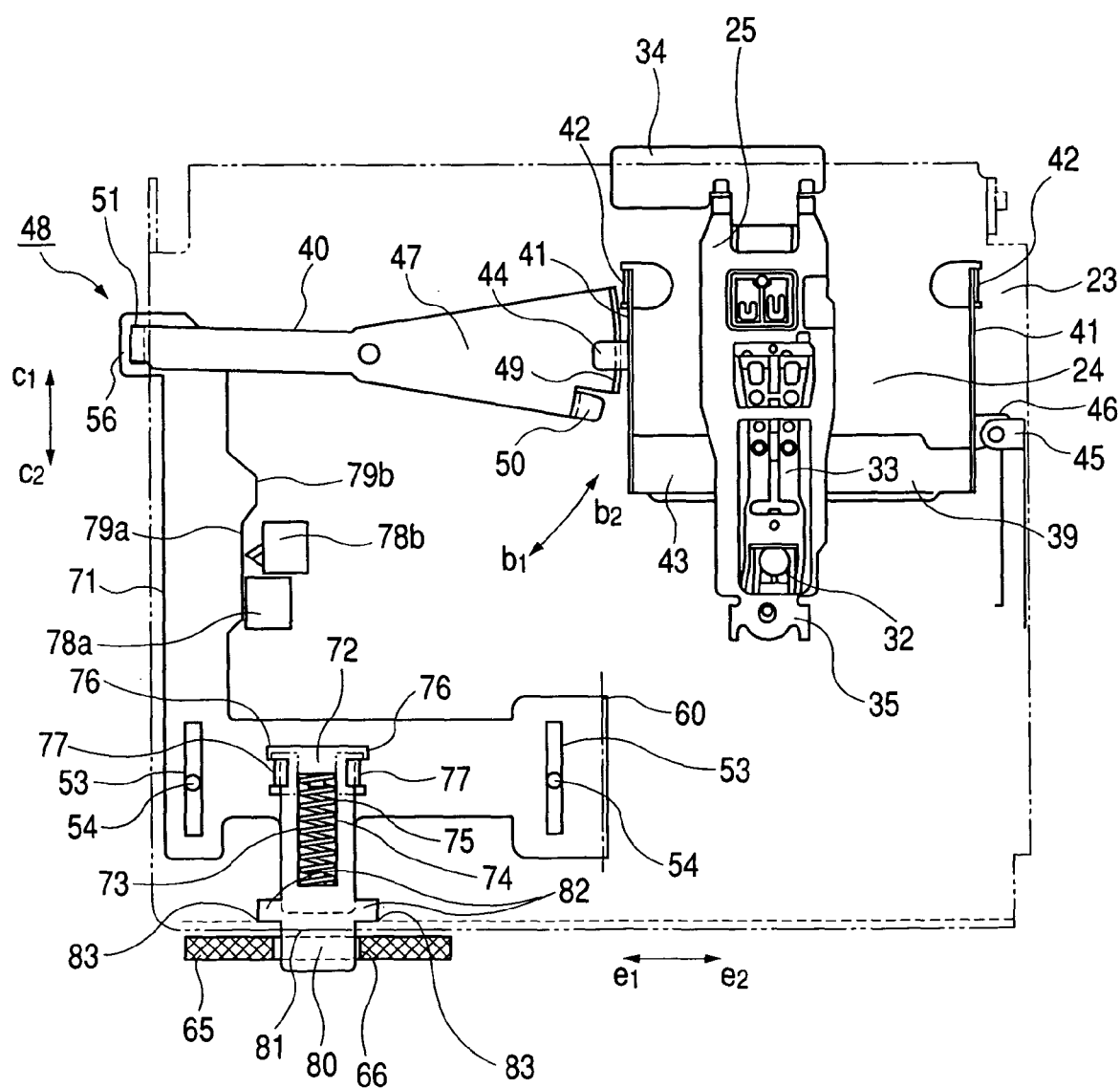
FIG. 11 is a plan view of the apparatus of FIG. 10 showing a state that the magnetic head ascending/descending mechanism has moved the ascending/descending control lever to an intermediate position.
Figure 12:
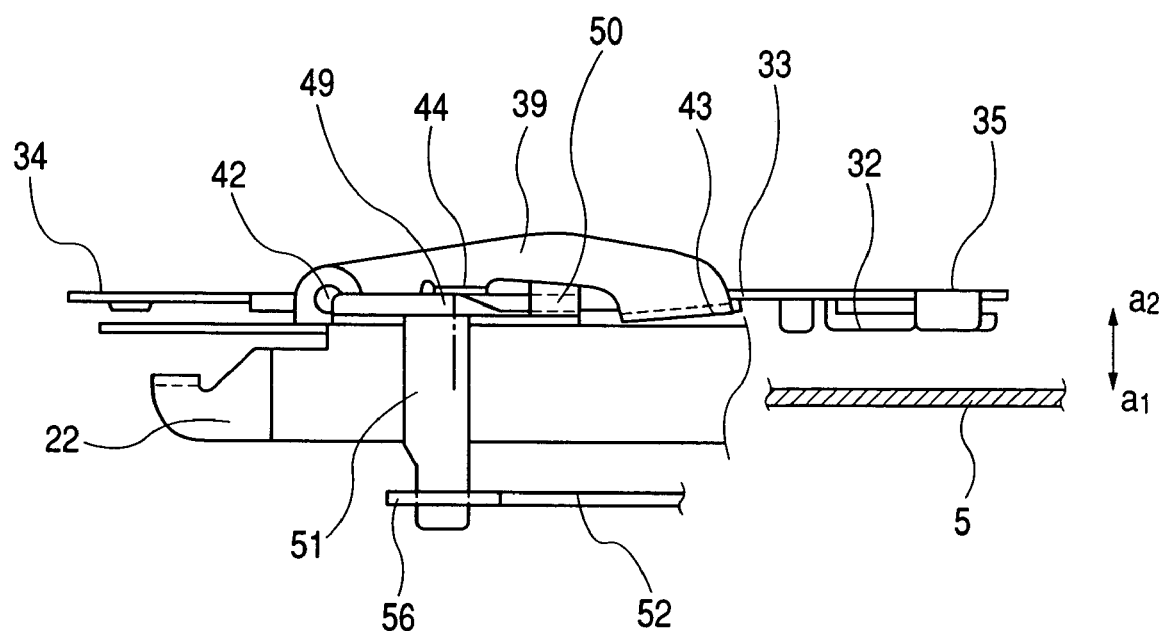
FIG. 12 is a side view of one side of the state shown in FIG. 11.

FIG. 11 shows a situation in which the ascending/descending control lever 71 has moved from the position in FIG. 10 by substantially half the full length of movement L1 in the direction c2. As shown in FIG. 12, an operation piece 49 of a rotation operation lever 40 contacts an actuating section 44 of an ascending/descending operation plate 39 at a high position of the cam of the operation piece 49, and the magnetic head section 25 remains separated from the magneto-optical disk 5. The ejection operation switching member 72 on the ascending/descending control lever 71 moves by the same amount as that of the ascending/descending control lever 71, and an end 80 goes into a notch 81 of the base chassis 23 and an opening 66 of the ejecting operation section.

Furthermore, a second stopper section 82 contacts a side wall 83 of the notch 81 of the base chassis 23. The state of the compression spring 75 remains the same as in FIG. 10, and the positional relationship between the ascending/descending control lever 71 and the ejection operation switching member 72 remains unchanged. The detection section 78a can detect the contact with a cam section 79a to stop driving. In this condition, the ejection of the disk cartridge 1 is disabled even when the magnetic head section 25 is moved away from the magneto-optical disk 5.

Figure 13:
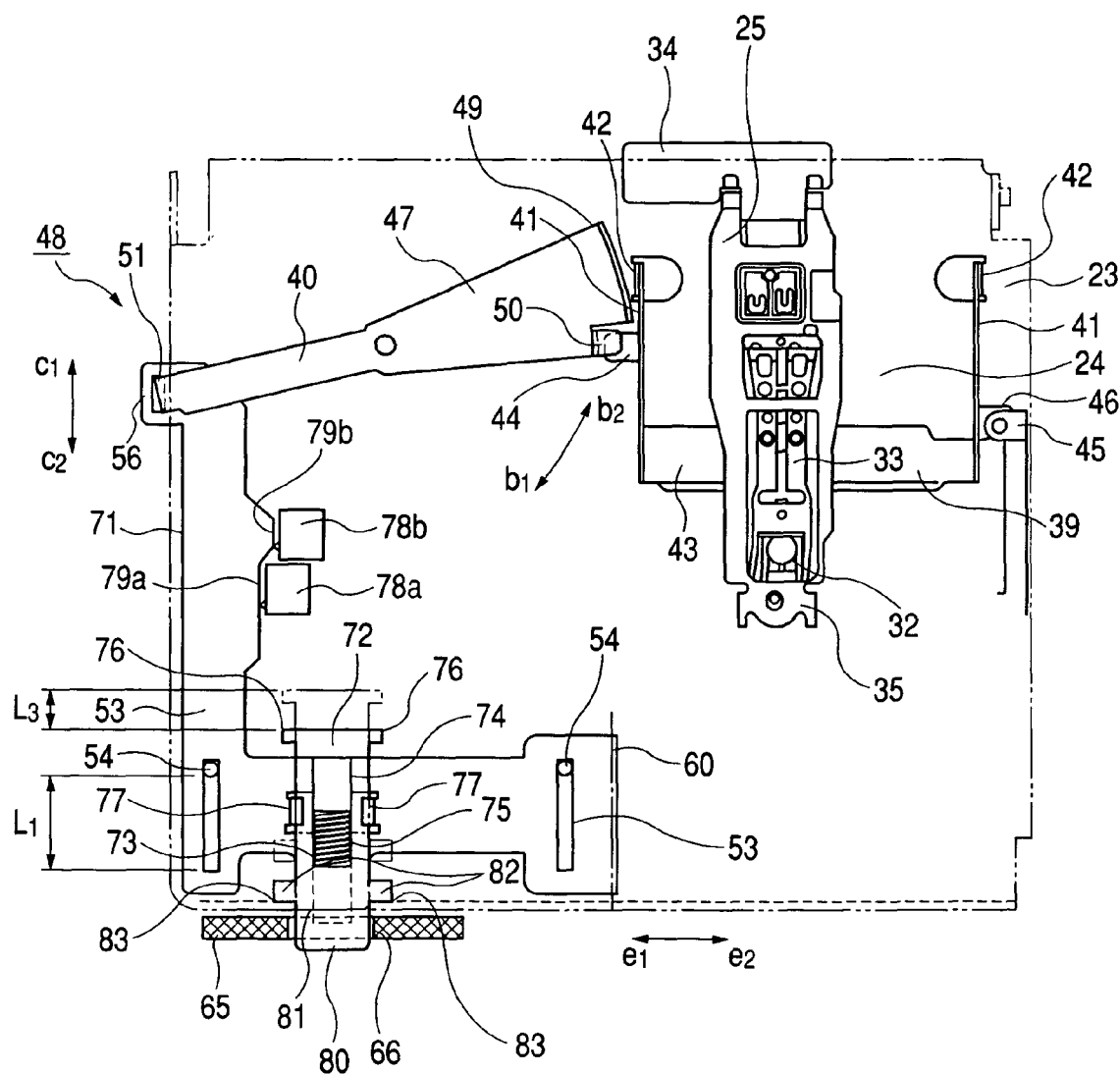
FIG. 13 is a plan view of the apparatus of FIG. 10 showing a state that the magnetic head ascending/descending mechanism has moved the magnetic head away from the magneto-optical disk.

FIG. 13 shows a situation in which the ascending/descending control lever 71 has further moved from the position in FIG. 11 in the direction c2. The rotation operation lever 40 has rotated in the direction b2, the actuating section 44 of the ascending/descending operation plate 39 moves away from the operation piece 49, and the magnetic head section 25 descends to a position proximate to the magneto-optical disk 5. The cam section 79b of the ascending/descending control lever 71 contacts the detection section 78b, both the detection sections 78a and 78b turn ON and the driving means stops. The ascending/descending control lever side of the compression spring 75 is pressed in the direction c2 and compressed, and the relative positions with respect to the ascending/descending control lever 71 and the ejection operation switching member 72 change. This makes it possible to shorten the length L3 of movement of the ejection operation switching member in the same direction compared to the length L1 of movement of the ascending/descending control lever as in the case of Embodiment 1.

Thus, it is possible to select whether the disk cartridge 1 can be ejected or not as the disk recording/reproducing apparatus when the magnetic head section 25 is moved away from the magneto-optical disk 5.

Embodiment 1 does not provide any stop position between the ascent position and descent position of the magnetic head section 25 so that the inclination of the cam of the operation piece is continuous. However, as in the case of Embodiment 2, it is possible to provide a detection section at a midpoint, for example, so that the ascending/descending control lever can stop at a position slightly separate from the magneto-optical disk. This allows a reproducing operation to start immediately after a descent not at a position where the magnetic head section has fully ascended, thereby making it possible to realize a disk recording/reproducing apparatus with excellent operability.

As is apparent from the above-described explanations, the magnetic head ascending/descending control apparatus of the present invention can differentiate the length of movement of the ascending/descending control lever of the magnetic head from the length of movement of the disk cartridge ejection operation switching member, thereby reducing the driving force to reduce the size and save power of the disk recording/reproducing apparatus, and reducing the number of parts to reduce the manufacturing cost.

Furthermore, in this magnetic head ascending/descending control apparatus, it is possible to add one or more points to decide whether a disk cartridge can be ejected or not, in addition to two points of the ascent position and descent position of the magnetic head section, thereby improving operability and performance of the disk recording/reproducing apparatus.

What is claimed is:

1. A disk recording/reproducing apparatus comprising:
   a magnetic head which ascends or descends between a first position proximate to a disk recording medium housed in a cartridge and a second position away from the medium;
   an ascending/descending control lever which controls ascent/descent of the magnetic head;
   a driving means which drives the ascending/descending control lever; and
   an ejecting operation section which couples with the ascending/descending control lever and which can move between a position where the cartridge is allowed to be ejected out of the apparatus and a position where the cartridge is disabled from being ejected in accordance with movement of the ascending/descending control lever,
   wherein the ejection operation section is supported in a manner rotatable on its one end with respect to the chassis of the apparatus, the ejection operation section has a guide cam which can be engaged with a driving axis provided on the ascending/descending control lever, and the guide cam is structured such that a length of movement of the ejection operation section is shorter than a length of movement of the ascending/descending control lever.

2. The apparatus according to claim 1, further comprising:
   a rotation operation lever which is supported in a rotatable manner with respect to the chassis of the apparatus, one end of which is coupled with the ascending/descending control lever, and which can rotate in accordance with movement of the ascending/descending control lever; and
   an ascending/descending operation plate which contacts the other end of the rotation operation lever, and which can rotate between the first position and second position of the magnetic head in accordance with rotation of the rotation operation lever.

3. A disk recording/reproducing apparatus comprising:
   a magnetic head which ascends or descends between a first position proximate to a disk recording medium housed in a cartridge and a second position away from the medium;
   an ascending/descending control lever which controls ascent/descent of the magnetic head;
   a driving means which drives the ascending/descending control lever; and
   an ejecting operation section which couples with the ascending/descending control lever and which can move between a position where the cartridge is allowed to be ejected out of the apparatus and a position where the cartridge is disabled from being ejected in accordance with movement of the ascending/descending control lever,
   wherein the ejection operation section is supported by the ascending/descending control lever in a state of biasing the ejection operation section with a compression spring, and an amount of movement of the ejection operation section is absorbed by the compression spring such that a length of movement of the ejection operation section is shorter than a length of movement of the ascending/descending control lever.

4. The apparatus according to claim 3, further comprising:

a rotation operation lever which is supported in a rotatable manner with respect to the chassis of the apparatus, one end of which is coupled with the ascending/descending control lever, and which can rotate in accordance with movement of the ascending/descending control lever; and an ascending/descending operation plate which contacts the other end of the rotation operation lever, and which can rotate between the first position and second position of the magnetic head in accordance with rotation of the rotation operation lever.

* * * * *